(12) United States Patent
Haager et al.

(10) Patent No.: US 7,436,658 B1
(45) Date of Patent: Oct. 14, 2008

(54) MOUNTING FOR DUAL HARD DRIVES

(75) Inventors: James A. Haager, Phoenix, AZ (US); Ronald E. Tupa, Mesa, AZ (US); Daniel P. Fogelson, Chandler, AZ (US)

(73) Assignee: Adtron Corporation, Phoenix, AZ (US)

( * ) Notice: Subject to any disclaimer, the term of this patent is extended or adjusted under 35 U.S.C. 154(b) by 388 days.

(21) Appl. No.: 11/086,017

(22) Filed: Mar. 22, 2005

(51) Int. Cl.
*G06F 1/16* (2006.01)
(52) U.S. Cl. .................... 361/685; 361/724; 312/223.1
(58) Field of Classification Search ......... 361/679–683, 361/685, 724–727, 736; 312/223.1, 223.2, 312/333; 360/97.01, 97.02
See application file for complete search history.

(56) References Cited

U.S. PATENT DOCUMENTS

| | | | | |
|---|---|---|---|---|
| 4,941,841 | A | 7/1990 | Darden et al. | 361/685 |
| 5,422,767 | A * | 6/1995 | Hatchett et al. | 360/98.01 |
| 5,492,481 | A | 2/1996 | Lewis | 439/159 |
| 6,078,498 | A * | 6/2000 | Eckerd et al. | 361/685 |
| 6,392,892 | B1 * | 5/2002 | Sobolewski et al. | 361/724 |
| 6,414,928 | B1 | 7/2002 | Aoki et al. | 369/77.1 |
| 6,456,489 | B1 | 9/2002 | Davis et al. | 361/684 |
| 6,459,571 | B1 * | 10/2002 | Carteau | 361/684 |
| 6,473,297 | B1 | 10/2002 | Behl et al. | 361/685 |
| 6,535,381 | B2 * | 3/2003 | Jahne et al. | 361/685 |
| 6,716,035 | B2 | 4/2004 | Haager et al. | 439/64 |
| 6,744,635 | B2 | 6/2004 | Portman et al. | 361/760 |
| 6,754,082 | B1 * | 6/2004 | Ding et al. | 361/727 |
| 6,831,832 | B2 | 12/2004 | Haager et al. | 361/685 |
| 6,918,177 | B2 | 7/2005 | Haager et al. | 29/832 |
| 7,113,398 | B2 * | 9/2006 | Oba et al. | 361/685 |
| 7,154,757 | B1 * | 12/2006 | Pavol et al. | 361/740 |

OTHER PUBLICATIONS

AMAMAX, webpages reciting removable racks for hard dis drives, printed Aug. 2, 2005.
DIRECTRON, webpages entitled "Lian-Li Aluminum Inner Tray for RH-321 Mobile (sic) Rack for 720/15000RPM 3.5" HDD, Copyright dates of 1997-2005.
DIRECTRON, webpages entitled "Lian-Li RH-321 Mobile Rack", 2 pages as published on internet, Copyright dates of 1997-2005.
RAM, webpages entitled "Hard Drive Mobile Racks", 2 pages as published on internet, dated Aug. 5, 2005.

* cited by examiner

*Primary Examiner*—Jayprakash N Gandhi
*Assistant Examiner*—Anthony Q Edwards
(74) *Attorney, Agent, or Firm*—Cahill, von Hellens & Glazer, PLC (57) ABSTRACT

A pair of hard drives are slidably mounted upon a mounting displaced from an underlying printed circuit board secured to a base. The mounting includes a centrally located aperture beneath each hard drive to expose the underside of the hard drive to a cooling air flow flowing between the mounting and the printed circuit board. Rails, secured to the underside of each hard drive, slidably engage corresponding grooves in a respective section of the mounting and a locking bolt is used to secure a rail of the hard drive with the mounting. A ribbon cable having connectors at opposed ends interconnects each hard drive with the printed circuit board and the respective section of the mounting may include a tab to maintain the connector of the ribbon cable in engagement with a corresponding connector on the printed circuit board.

20 Claims, 6 Drawing Sheets

MOUNTING FOR DUAL HARD DRIVES

BACKGROUND OF THE INVENTION

1. Field of the Invention

The present invention relates to a mounting for hard drives and, more particularly, to a mounting for compactly and removably attaching a pair of hard drives on a base.

2. Description of Related Art

Hard drives are used in conjunction with all computers for data storage and retrieval. Such a hard drive is generally mounted upon a base to mechanically secure the hard drive and to effect the necessary electrical conductions. Over a period of years, certain industry standards have been developed for the length, width and height of the hard drive and supporting base. This is sometimes referred to as a form factor. Such standardization is necessary in order to accommodate interchangeability of hard drive modules (hard drive and supporting base) irrespective of the manufacturer. Specifically, the dimensions for the base are 5¾" (146.1 mm) in length, 4" (101.6 mm) in width, and 1" (25.4 mm) in height.

Conventionally, a single hard drive is mounted upon a base and in compliance with the form factor. For redundancy purposes, one must therefore use two modules instead of a single module. This necessarily doubles the panel space of the equipment with which the hard drives are used. It may be noted that except for special purpose hard drives, there are industry standards for the length, width and height of hard drives which manufacturers of hard drives honor. Were it otherwise, interchangeability between the products of various manufacturers would be impossible.

SUMMARY OF THE INVENTION

A base of predetermined size and configuration supports a printed circuit board for electrically interconnecting a pair of hard drives with the central processing unit of a computer. A mounting, defining two pairs of rails, is supported above and displaced from the printed circuit board to slidably receive a pair of hard drives having mating rails. The pairs of rails on the mounting are oriented laterally whereby the hard drives are slid onto and off of the mounting from the side. The mounting includes a relatively large aperture intermediate each pair of rails to expose the underside of each hard drive to a cooling flow of air intermediate the mounting and the printed circuit board. A pair of ribbon cables electrically interconnect the hard drives with circuitry on the printed circuit board. A locking bolt associated with a rail of each hard drive locks the hard drive to the mounting.

It is therefore a primary object of the invention to provide a mounting attached to a base of preset dimensions for detachably attaching a pair of hard drives.

Another object of the present invention is to provide a mounting for a pair of hard drives that accommodates a cooling flow of air between the bottom of the hard drives and an underlying printed circuit board.

Still another object of the present invention is to provide a pair of redundant hard drives mounted on a base conventionally sized for a single hard drive.

Still another object of the present invention is to provide redundancy from a pair of hard drives mounted on a base of specified form factor that conventionally supports a single hard drive.

A further object of the present invention is to provide a mounting for rigidly supporting a pair of hard drives side by side and yet accommodate removal and replacement of either hard drive independently of the other hard drive.

A still further object of the present invention is to provide access for a cooling flow of air to the bottom of a pair of hard drives mounted on a single base.

A yet further object of the present invention is to provide a method for obtaining hard drive redundancy within a predetermined volume established for a single hard drive mounting.

A still further object of the present invention is to provide a method for mounting a pair of hard drives on a mounting attached to a base of predetermined form factor.

These and other objects of the present invention will become apparent to those skilled in the art.

BRIEF DESCRIPTION OF THE DRAWINGS

The present invention will be described with greater specificity and clarity with reference to the following drawings, in which:

FIG. 10 is an exploded view of the major components supported on the base and FIG. 10a shows a detail view.

DESCRIPTION OF THE PREFERRED EMBODIMENT

The environment for most electronic equipment places a premium on compactness, minimal front panel space and density of components. Moreover, the potential destructive effects of vibration must be addressed. The electronic equipment generates heat, which, if in excess of a certain temperature range will compromise operability and may result in destruction of one or another electrical component. It is therefore mandatory that accommodations be made to dissipate the heat generated. Such heat dissipation is usually by use of a fan blowing cooling air around and about the heat generating components. To obtain effective cooling, one or more plenums or passageways should be provided for channeling the air flow into effective cooling contact with the heat generating device.

Particularly in mobile military environments, whether in land, sea or air vehicles, space is almost always a serious concern. Moreover, as failures of equipment in military vehicles does occur, redundancy is of critical importance. If such redundancy can be accomplished by compact packaging of the relevant modules without increasing the size of a module, significant advantages may be achieved with respect to completion of a mission and safety of personnel.

Figure 1:
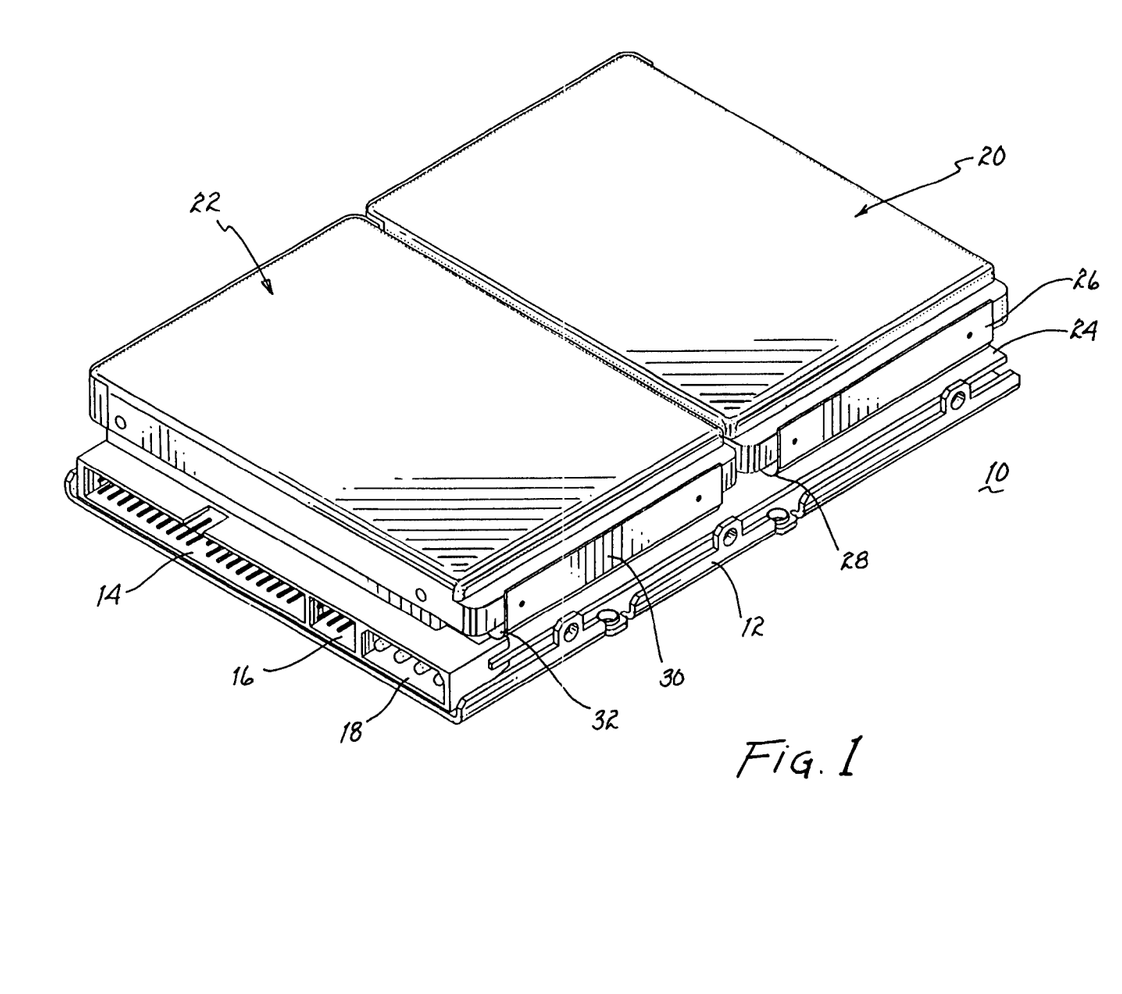
FIG. 1 is a perspective view illustrating two standard sized hard drives mounted upon a base of specified form factor.

Referring to FIG. 1, there is shown a dual hard drive module 10. It includes a base 12 of specified form factor having a length of 5.75" (146.1 mm) and a width of 4" (101.6 mm). A plurality of connectors 14, 16 and 18 are mounted at the rear of base 12 for electrical connection with mating connectors associated with various related electronic equipments. A pair of hard drives 20, 22 are mounted upon base 12, as will be described below in further detail. A printed circuit board (PCB) 24 is secured to base 12 and serves as an interface unit interconnecting hard drives 20, 22 with respective groups of pins 14, 16 and 18 of a connector 19. An electrical interface between hard drive 20 and PCB 24 is provided by a connector 26 mounted at the end of a ribbon cable 28. Similarly, a connector 30 electrically interconnects hard drive 22 with PCB 24 through a ribbon cable 32.

Figure 2:
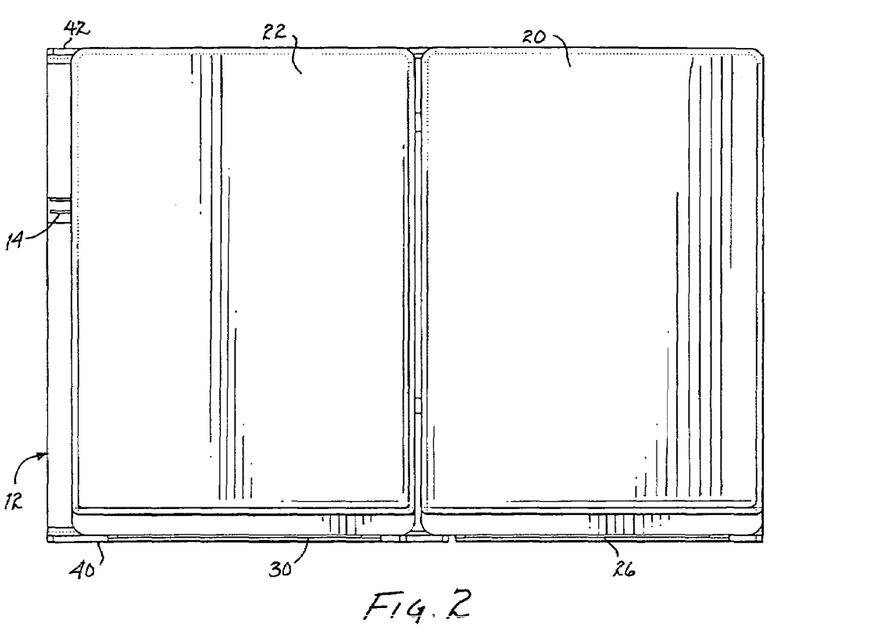
FIG. 2 is a top view of the hard drives and base shown in FIG. 1.
Figure 3:
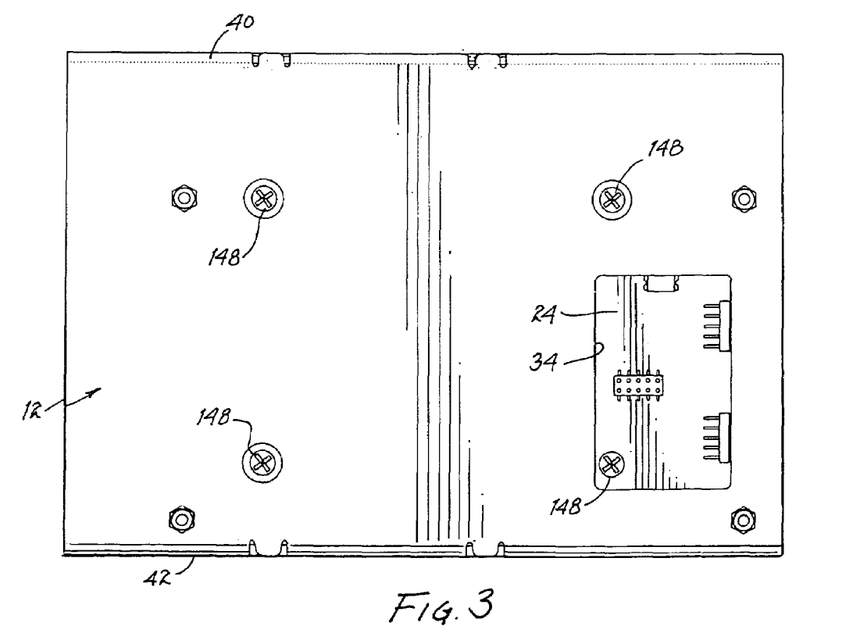
FIG. 3 is a bottom view of the base.

As shown in FIGS. 2 and 3, hard drives 20, 22, including their respective connectors 26, are within the plan form defined by the length and width boundaries of base 12. As particularly shown in FIG. 3, base 12 may include an opening 34 for access to components of PCB 24.

Figure 4:
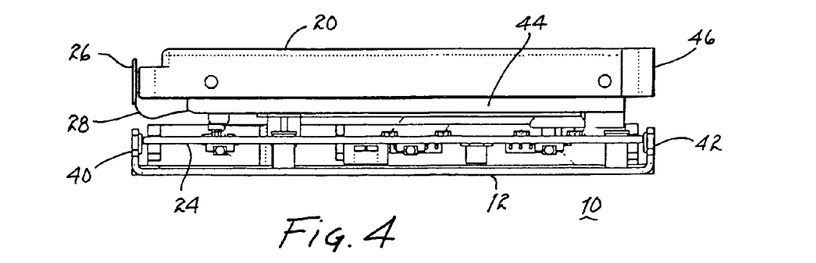
FIG. 4 is a front elevational view of the base and hard drives.

FIG. 4 is a front view of module 10 showing PCB 24 secured to base 12 intermediate side walls 40, 42. A mounting 44 is attached to the base and slidably supports hard drive 20, as will be described in more detail below. This figure particularly illustrates that connector 26 and its ribbon cable 28 are within a vertical plane extending upwardly from the exterior surface of side wall 40. Similarly, the other edge 46 of hard drive 20 (including any dielectric tape that may be electronically shielding the edge) is within a vertical plane coincident with the external surface of side wall 42.

Figure 5:
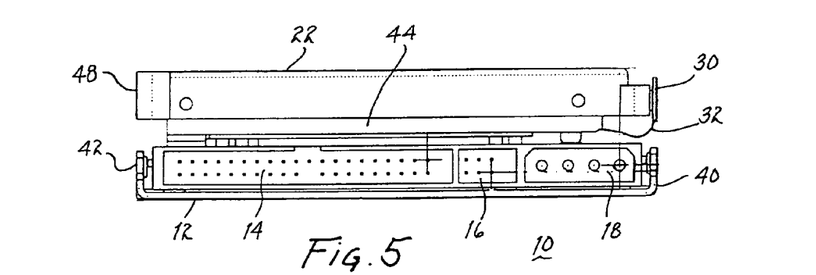
FIG. 5 is a rear elevational view of the base and hard drives.

FIG. 5 is a rear elevational view of module 10 and shows connector 19 having groups of pins 14, 16 and 18 mounted on base 12 intermediate side walls 40, 42. Mounting 44, extending beneath hard drives 20, 22 supports hard drive 22. Connector 30, ribbon cable 32 and edge 48 (including any dielectric tape that may be electrically shielding the edge) of this hard drive are also within vertical planes extending upwardly from the exterior surfaces of sidewalls 40, 42.

Figure 6:
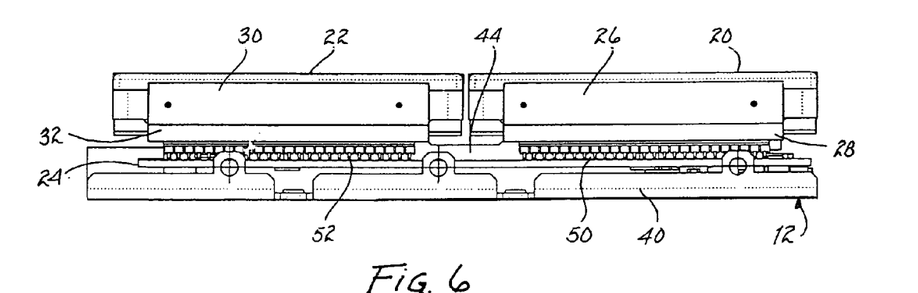
FIG. 6 is a left side elevational view of the base and hard drives.

FIG. 6 illustrates a left side view of module 10 further showing the compactness of the elements constituting the module. PCB 24 mates with electrical connector 50 located at the other end of ribbon cable 28 to interconnect hard drive 20 through conductor 26 with the PCB. Similarly, electrical connector 52 interconnects ribbon cable 32 with PCB 24. Connector 30 at the other end of ribbon cable 32 is electrically connected to hard drive 22. Mounting 44 extends between and mechanically secures hard drives 20, 22 to PCB 24, which is secured to base 12, as will be described in further detail below.

Figure 7:
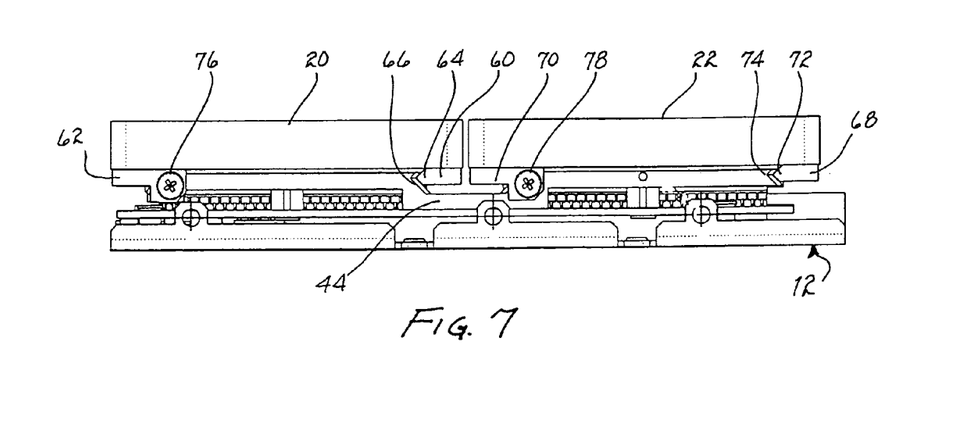
FIG. 7 is a right side elevational view of the base and hard drives.

FIG. 7 is an elevational view of the right side of module 10. In particular, this figure illustrates mounting 44 and extending beneath each of hard drives 20, 22. A pair of rails 60, 62 are secured to the underside of hard drive 20 approximately adjacent opposed edges thereof. Rail 60 includes a longitudinally extending ridge 64. Rail 62 includes a similar ridge but is not shown in FIG. 7. Ridge 64 slidably mates with a groove 66 formed in mounting 44. A pair of rails 68, 70 are attached to the underside of hard drive 22 generally along opposed edges thereof. Rail 68 includes a ridge 72 slidably mating with a groove 74 in mounting 44. Rail 70 includes a similar ridge (not shown in FIG. 7). A bolt 76 is captured in a part of rail 62 for threaded engagement with mounting 44 to secure hard drive 20 to the mounting. A similar bolt 78 is captured by a part of rail 70 for threaded engagement with mounting 44 to secure hard drive 22 to the mounting. Thereby, both hard drives are independently secured to the underlying mounting and may be independently removed or replaced. If the hard drives are used for redundancy purposes, it becomes self evident that either hard drive may be removed/replaced without loss of data. It is well within the skill of one skilled in the art to create appropriate software for ensuring commonality of data in each of the hard drives.

Figure 8:
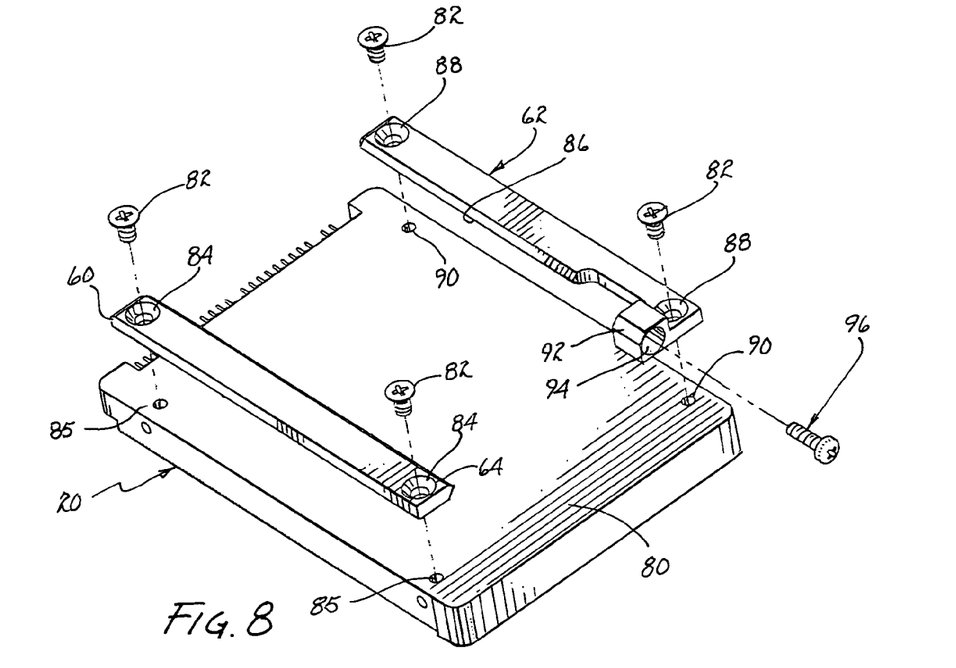
FIG. 8 illustrates the bottom of a hard drive and the rails to be attached thereto.
Figure 9:
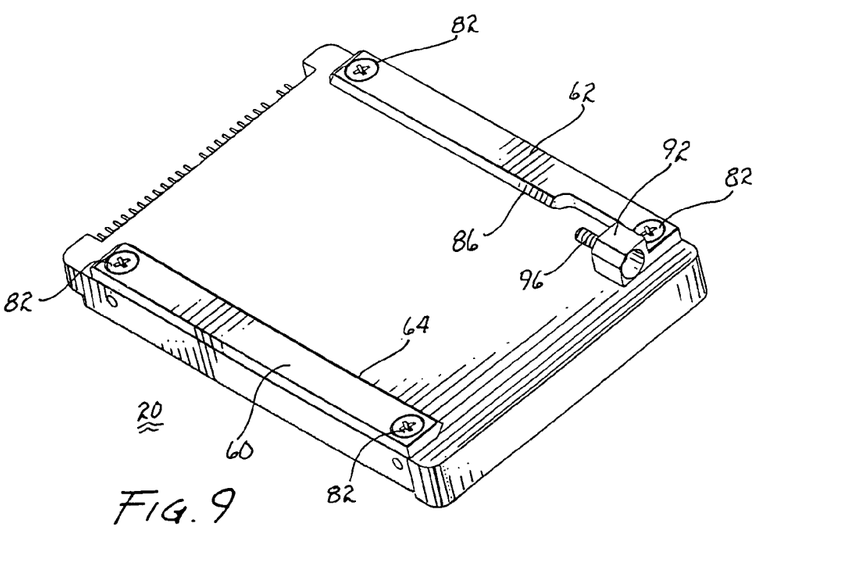
FIG. 9 illustrates a hard drive with attached rails.

Referring jointly to FIGS. 7, 8 and 9, further details attendant the rails attached to a hard drive will be described. For reference purposes, hard drive 20 (shown in FIGS. 8 and 9) will be described; it is to be understood that hard drive 22 includes an identical pair of rails. Rail 60 includes ridge 64, which may be defined by a sharp edge having an angle of approximately 90°. This ridge faces inwardly, as illustrated. The rail is secured to bottom surface 80 of the hard drive by a pair of bolts 82, extending through countersunk holes 84 in rail 60. The bolts threadedly engage threaded holes 85 in hard drive 20. Rail 62 includes an inwardly oriented ridge 86, which may be a sharp edge defining approximately 90°. The rail is also secured to hard drive 20 by bolts 82 penetrably engaging countersunk holes 88. The bolts threadedly engage threaded holes 90 in the hard drive. Rail 62 includes a bulbous section 92 extending from the front end of the rail. This bulbous section includes a passageway 94 for penetrably receiving a locking bolt 96. Bolt 96 may be captured within passageway 94 to prevent loss of the bolt and yet accommodate threaded engagement of the bolt with the mounting, as will be described.

Figure 10:
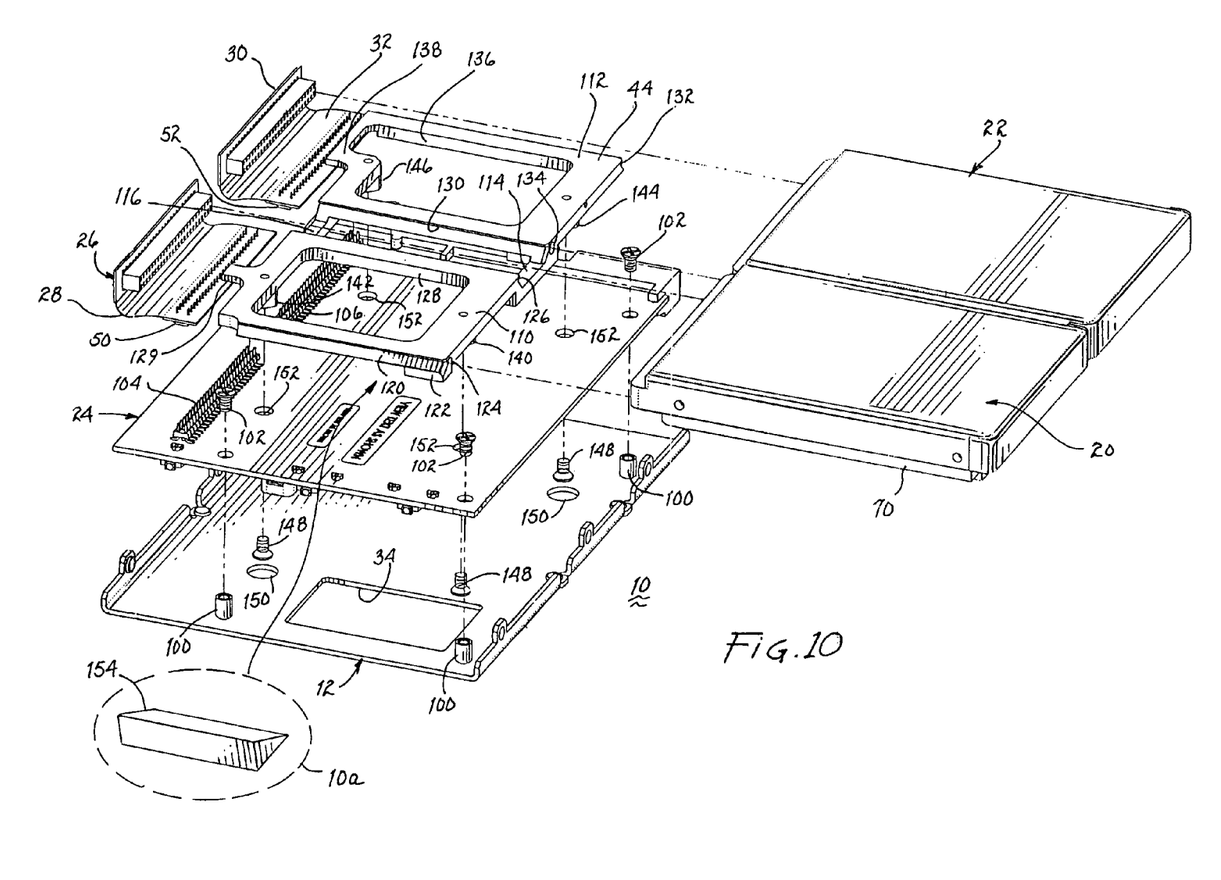

Elements of module 10 not discussed in detail above will be described with reference to the exploded view shown in FIG. 10. Base 12 includes a plurality of threaded standoffs 100 for supporting PCB 24. The PCB is secured to the standoffs by a plurality of bolts 102. Male electrical connectors 104, 106 are mounted on the PCB for engagement by female electrical connectors 50, 52, respectively, at the end of ribbon cables 28, 32, respectively. Mounting 44 includes two sections 110, 112 fixedly secured to one another by interconnecting lands 114, 116. Thereby, mounting 44 is a unitary structure. It is to be appreciated that in other environments, wherein positional accuracy is of significant importance, a similar mounting may include a plurality of sections joined to one another by lands or the like to establish positional accuracy of devices mounted thereon (as shown in further detail in FIG. 11).

Section 110 includes a longitudinal groove 120 for slidably receiving and mating with ridge 86 of rail 62 attached to hard drive 20. A further groove 126 is disposed on the other side of section 110 to slidably receive ridge 64 of rail 60 attached to hard drive 20 (see FIG. 8). An expanded section 122 depends from section 110 and includes a threaded aperture 124 for engagement with locking bolt 96 (see FIG. 8) to secure hard drive 20 to section 110 of mounting 44. Thereby, module 20 is in slidable engagement with section 110 and can be lockingly secured thereto by bolt 96 engaging threaded hole 124 in expanded section 122. Section 110 further includes an aperture 128 of relatively large size to expose the underside of hard drive 20. A tab 129 extends from the rear of section 110 to bear against electrical connector 50 and maintain it in electrical contact with connector 104 mounted on the PCB.

Section 112 also includes a longitudinal groove 130 for slidably engaging ridge 86 of a corresponding rail (62) secured to hard drive 22. A further groove 132 is formed on the opposite side of section 112 to engage ridge (64) of a corresponding rail (60) attached to hard drive 22. A threaded aperture 134 is disposed at the approximate junction of land 114 and section 112 to threadedly engage bolt 96 extending from rail 62 attached to the bottom of hard drive 22 to lock the hard drive with section 112. An aperture 136 is formed in the center of section 112 to expose the bottom surface of hard drive 22. A tab 138 extends from the rear of section 112 to overlie and bear against connector 52 to retain it in contact with connector 106 extending from PCB 24.

A plurality of standoffs 140, 142, 144 and 146 extend downwardly from mounting 44 and are supported by PCB 24.

These standoffs include threaded passageways for engagement by bolts 148 extending through apertures 152 in PCB 24 to attach the mounting to PCB 24. Access to these bolts is provided by apertures 150 and opening 34 in base 12 (see also FIG. 3).

By use of the standoffs, sections 110 and 112 of mounting 44 are displaced from the PCB and a plenum or passageway is defined between the PCB and the mounting. As is normal in most electrical equipment, a cooling fan is employed to circulate cooling air about the electrical components. Such cooling air will flow intermediate the PCB and the mounting. Because of the access provided by apertures 128, 136 in sections 110, 112, respectively, the cooling air will also come in contact with the underside of hard drives 20, 22 and perform a cooling function. Thereby, the temperature of the hard drives can be readily maintained within an acceptable temperature range. To enhance the flow of air against the undersides of hard drives 20, 22, a vane or other air flow deflector may be employed. A representative ramp 154 is shown in FIG. 10*a* for this purpose. Such vane, deflector or ramp could be mounted on the PCB or formed as part of mounting 44.

Figure 11:
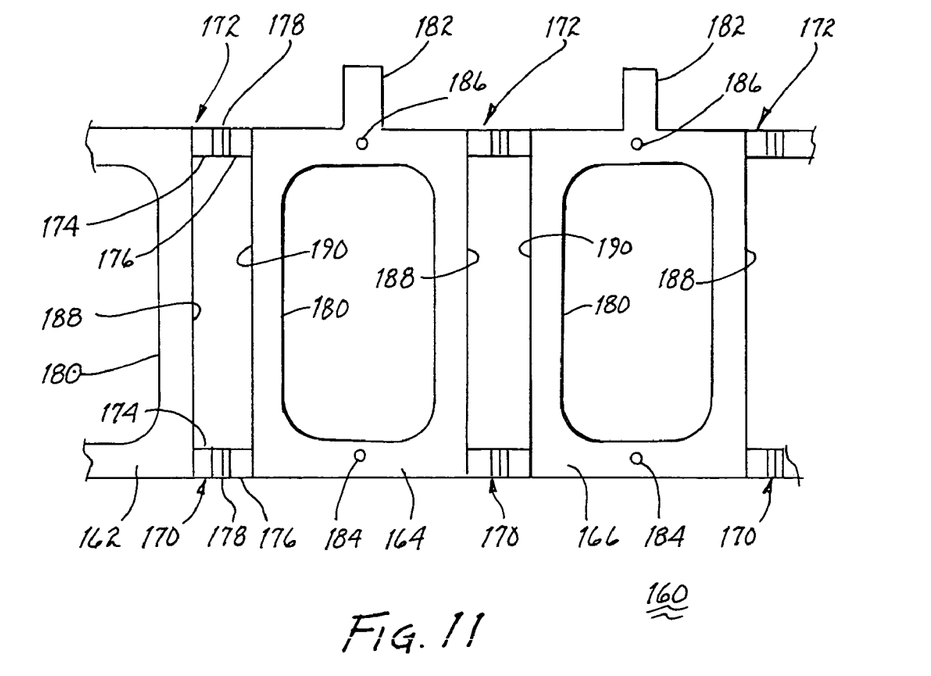
FIG. 11 illustrates a multi-segment mounting.

Referring to FIG. 11, there is illustrated a modified mounting 160. This mounting may be used with a plurality of hard drives in the manner described above. Alternatively, it may support a plurality of other like units, whether interconnected in series, in parallel or as functionally segregated units.

Mounting 160 includes a plurality of sections 162, 164, 166, etc., in series and interconnected by lands, such as sets of lands 170, 172. Each set of these sets of lands includes three parts. A pair of land elements 174, 176 are interconnected by a V groove 178 or other reduced thickness (breadth) element. Thereby, a string of sections can be segregated into one, two or more sections by segregating land elements 174, 176 from one another at the V groove by flexing, cutting, etc.

Each of these sections includes a central aperture 180 to enhance the flow of cooling air in and about the supported unit. Moreover, a tab 182 may be associated with each section for locking a pair of connectors to one another, as described above, or for other reasons. One or more apertures 184, 186 may be embodied in each section for purposes of attachment, or otherwise.

Opposed edges 188, 190 of each section may include grooves, as described above for slidably receiving and retaining rails attached to the underside of a unit to be brought into slidable engagement with the respective section.

We claim:

1. A module for mounting hard drives, said module comprising in combination:
   a. a base conforming in plan form to a specified form factor;
   b. a printed circuit board attached to said base;
   c. a mounting supported on said printed circuit board in spaced relationship therefrom to provide space between said mounting and said printed circuit board;
   d. a pair of hard drives for detachable attachment with said mounting;
   e. a first pair of rails disposed on said mounting for slidably engaging a corresponding pair of rails on the bottom of one of said hard drives and a second pair of rails disposed on said mounting for slidably engaging a corresponding pair of rails on the bottom of the other of said hard drives; and
   f. a first locking bolt for locking one of said hard drives to said mounting and a second locking bolt for locking the other of said hard drives to said mounting, each of said first and second locking bolts extending from one of said rails attached to each of said hard drives in threaded engagement with said mounting.

2. The module as set forth in claim 1, including first and second electrical connectors disposed on said printed circuit board, a first ribbon cable electrically interconnecting one of said hard drives with said first connector and a second ribbon cable electrically interconnecting the other of said hard drives with said second connector.

3. The module as set forth in claim 1 wherein said mounting includes a first tab for locking said first connector with said printed circuit board and a second tab for locking said second connector with said printed circuit board.

4. The module as set forth in claim 1 wherein said mounting includes an aperture adjacent each of said hard drives to expose each of said hard drives to a flow of air intermediate said printed circuit board and said mounting.

5. The module as set forth in claim 1 wherein the length of said base is greater than the width of said base and wherein said first and second pairs of rails of said mounting extend across the width of said base.

6. A hard drive assembly, said assembly comprising in combination:
   a. a base having a greater length than width;
   b. a printed circuit board mounted on said base;
   c. a mounting displaced from said printed circuit board to define a channel between said printed circuit board and said mounting;
   d. a first pair of rails associated with said mounting and extending along the width of said base for slidably receiving a first hard drive, the first hard drive includes a further pair of rails adapted for sliding mating with said first pair of rails of said mounting;
   e. a second pair of rails associated with said mounting and extending along the width of said base for slidably receiving a second hard drive and for locating the second hard drive adjacent the first hard drive, said second hard drive including a yet further pair of rails adapted for sliding mating with said second pair of rails of said mounting;
   f. one rail of said further pair of rails of the first hard drive includes a penetrably engaged bolt adapted for threaded engagement with said mounting and wherein one rail of said yet further pair of rails of the second hard drive includes a further penetrably engaged bolt adapted for threaded engagement with said mounting.

7. The hard drive assembly as set forth in claim 6 wherein said mounting includes apertures in fluid communication with the channel.

8. The hard drive assembly as set forth in claim 6 wherein said mounting includes a first aperture disposed between said first pair of rails and a second aperture disposed between said second pair of rails.

9. The hard drive assembly as set forth in claim 6 wherein each rail of said first pair of rails includes a groove and wherein each rail of said second pair of rails includes a groove.

10. The hard drive assembly as set forth in claim 6, including standoffs for supporting said printed circuit board a distance from said base.

11. The hard drive assembly as set forth in claim 6, including standoffs for supporting said mounting a distance from said printed circuit board.

12. The hard drive assembly as set forth in claim 11, including standoffs for supporting said printed circuit board a distance from said base.

13. A hard drive assembly, said assembly comprising in combination:
   a. a base having a greater length than width;
   b. a printed circuit board mounted on said base;

c. a mounting displaced from said printed circuit board to define a channel between said printed circuit board and said mounting; and d. a pair of rails associated with said mounting and extending along said base for slidably receiving a hard drive, each rail of said pair of rails including a groove and wherein the hard drive includes a further pair of rails having ridges for slidable mating with said grooves, said further pair of rails of the hard drive including a penetrably engaged bolt adapted for threaded engagement with said mounting.

14. The hard drive assembly as set forth in claim 13 wherein said mounting includes at least one aperture in fluid communication with the channel.

15. The hard drive assembly as set forth in claim 13 wherein said mounting includes an aperture disposed between said pair of rails.

16. The hard drive assembly as set forth in claim 13, including standoffs for supporting said printed circuit board a distance from said base.

17. The hard drive assembly as set forth in claim 13, including standoffs for supporting said mounting a distance from said printed circuit board.

18. The hard drive assembly as set forth in claim 17, including standoffs for supporting said printed circuit board a distance from said base.

19. The hard drive assembly as set forth in claim 13 wherein said printed circuit board includes a mounted electrical connector and including a ribbon cable, said ribbon cable including an electrical connector disposed at one end and adapted for engaging said mounted electrical connector and a further electrical connector disposed at the other end and adapted for electrical connection with the hard drive.

20. The hard drive assembly as set forth in claim 19 wherein said mounting includes a tab for retaining said electrical connector at the one end of said ribbon cable in engagement with said mounted electrical connector.

* * * * *